(12) United States Patent
Shuert et al.

(10) Patent No.: US 10,160,180 B2
(45) Date of Patent: *Dec. 25, 2018

(54) MOLDED POLYMERIC STRUCTURE, METHOD AND APPARATUS FOR MAKING SAME

(71) Applicant: Shuert Technology, LLC, Sterling Heights, MI (US)

(72) Inventors: Lyle H. Shuert, Birmingham, MI (US); Thomas N. Young, Bloomfield Hills, MI (US)

(73) Assignee: Shuert Technology, LLC, Sterling Heights, MI (US)

(*) Notice: Subject to any disclaimer, the term of this patent is extended or adjusted under 35 U.S.C. 154(b) by 449 days.

This patent is subject to a terminal disclaimer.

(21) Appl. No.: 14/958,444

(22) Filed: Dec. 3, 2015

(65) Prior Publication Data

US 2016/0167336 A1     Jun. 16, 2016

Related U.S. Application Data

(63) Continuation-in-part of application No. 14/571,626, filed on Dec. 16, 2014.

(Continued)

(51) Int. Cl.
*B32B 3/30* (2006.01)
*B32B 27/08* (2006.01)
(Continued)

(52) U.S. Cl.
CPC ............ *B32B 3/30* (2013.01); *B32B 3/12* (2013.01); *B32B 7/045* (2013.01); *B32B 7/12* (2013.01); *B32B 15/08* (2013.01); *B32B 27/08* (2013.01); *B32B 27/32* (2013.01); *E04C 2/20* (2013.01); *E04C 2/24* (2013.01); *E04C 2/326* (2013.01);
(Continued)

(58) Field of Classification Search
CPC ................................... B32B 3/12; B32B 3/30
See application file for complete search history.

(56) References Cited

U.S. PATENT DOCUMENTS 2,809,908 A * 10/1957 French .......... E04C 2/3405
                                                    156/183
2,973,931 A    3/1961 Brown
(Continued)

*Primary Examiner* — Mark Ruthkosky
*Assistant Examiner* — Julia L Rummel
(74) *Attorney, Agent, or Firm* — Young Basile Hanlon & MacFarlane, P.C.

(57) ABSTRACT

A molded plastic core structure acceptable to numerous uses and characterized by high structural strength to weight ratio. The structure typically comprises a two-sided array of cell-like receptacles having inwardly sloping walls that form floors. Receptacles in one side are inverted relative to receptacles in the opposite side and are inter-nested between one another to minimize the volume of plastic used. The walls and floors can be circular, square or triangular in plan view. Where square or triangular, the walls include both major and minor wall sections alternatingly interspersed with one another. Two or more core structures can be joined to one another with the receptacles of one panel being aligned with the receptacles of the joined other panel to form closed, syntactic cells that give the resulting structure high enclosed volume to surface area and weight ratios.

3 Claims, 19 Drawing Sheets

Related U.S. Application Data

(60) Provisional application No. 61/964,474, filed on Dec. 16, 2013.

(51) Int. Cl.
  *B32B 27/32* (2006.01)
  *B32B 3/12* (2006.01)
  *B32B 7/04* (2006.01)
  *B32B 7/12* (2006.01)
  *B32B 15/08* (2006.01)
  *E04C 2/20* (2006.01)
  *E04C 2/24* (2006.01)
  *E04C 2/32* (2006.01)
  *B29K 23/00* (2006.01)
  *B29K 105/00* (2006.01)
  *B29C 51/08* (2006.01)
  *B29L 31/10* (2006.01)
  *B29K 105/04* (2006.01)

(52) U.S. Cl.
  CPC ...... *B29C 51/082* (2013.01); *B29K 2023/065* (2013.01); *B29K 2105/04* (2013.01); *B29K 2105/256* (2013.01); *B29L 2031/10* (2013.01); *B32B 2250/242* (2013.01); *B32B 2307/306* (2013.01); *B32B 2307/546* (2013.01); *B32B 2307/558* (2013.01); *B32B 2419/00* (2013.01); *B32B 2419/04* (2013.01); *B32B 2439/00* (2013.01); *B32B 2605/00* (2013.01); *B32B 2607/00* (2013.01); *Y10T 428/24165* (2015.01)

(56) References Cited

U.S. PATENT DOCUMENTS

| | | |
|---|---|---|
| 5,070,673 A | 12/1991 | Weisse |
| 5,242,735 A | 9/1993 | Blankenburg et al. |
| 5,390,467 A | 2/1995 | Shuert |
| 6,200,664 B1 | 3/2001 | Figge et al. |
| 2005/0263044 A1* | 12/2005 | Bearse ................ B29C 44/569 108/57.25 |
| 2007/0251170 A1 | 11/2007 | Uhlig et al. |
| 2009/0183455 A1 | 7/2009 | Polk, Jr. et al. |

\* cited by examiner

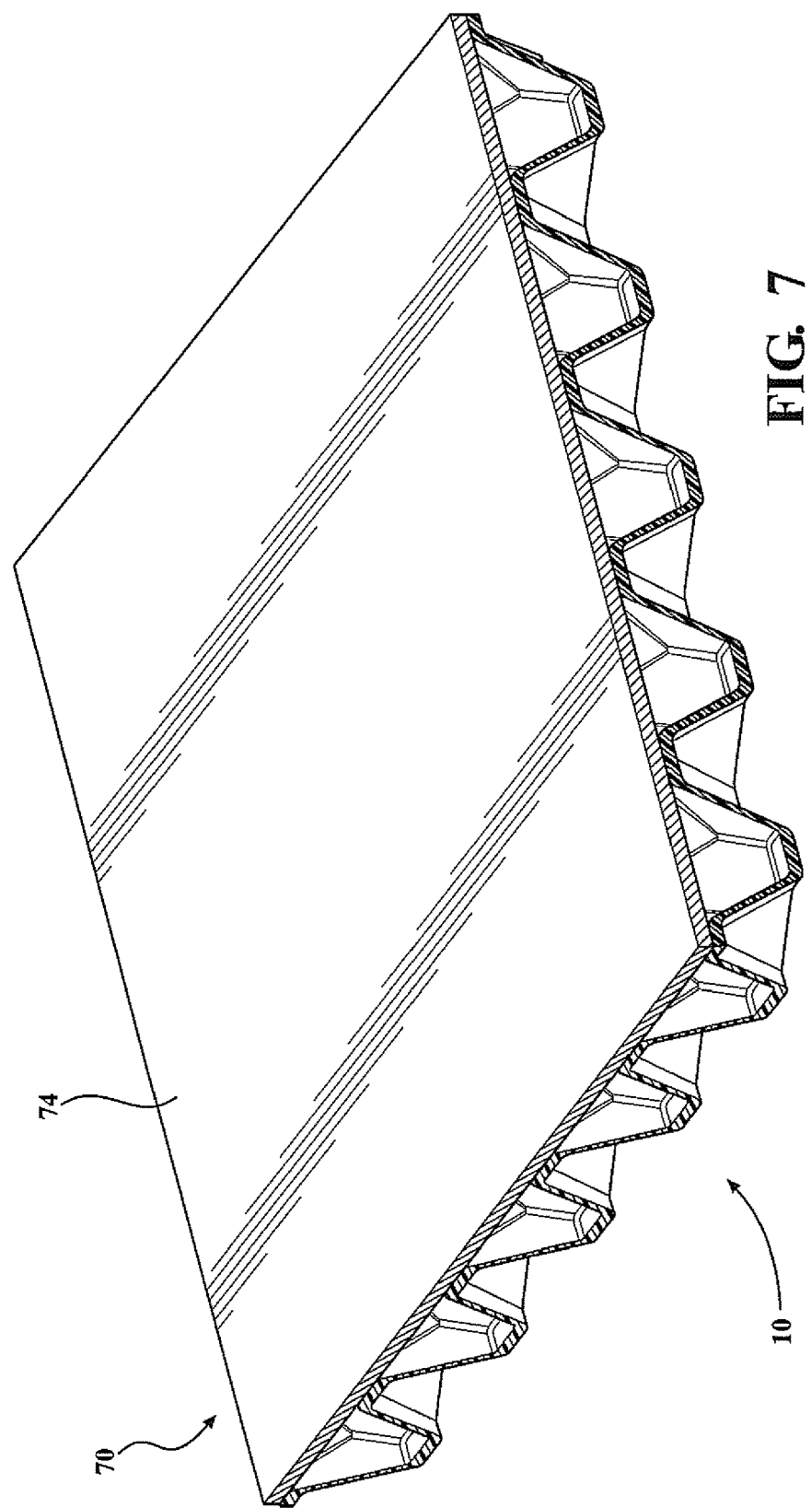

MOLDED POLYMERIC STRUCTURE, METHOD AND APPARATUS FOR MAKING SAME

CROSS-REFERENCE TO RELATED APPLICATION

This application is a continuation-in-part of U.S. Utility patent application Ser. No. 14/571,626 filed Dec. 16, 2014, which is a non-provisional of U.S. Provisional Application Ser. No. 61/916,474, filed Dec. 16, 2013, and claims the benefit thereof for common subject matter.

FIELD OF THE INVENTION

The invention is in the field of cellular molded polymeric structures, such as, but not limited to, structural panels, and more particularly to cellular structures with high strength to weight ratios.

BACKGROUND OF THE INVENTION

Cellular structures made from various materials are well-known. For example, a corrugated or "honeycomb" core of paperboard or plastic may be laminated between two flat sheets of similar or different material to produce a panel having significantly improved compression and bending strengths relative to single layer sheets of the same materials.

Such core structures are used to make various products including doors, wall panels, trailer bodies, and containers.

BRIEF SUMMARY OF THE INVENTION

Described herein are core structures made of polymeric materials such as HDPE that are characterized by cells or "receptacles" arranged in rows and columns on both sides of a single layer of plastic, the receptacles on one side inter-fitting with inverted receptacles on the opposite side in a syntactic fashion. The receptacles have walls that slope inwardly to form an interior floor, the outside surface of which is part of an exterior surface of the core structure on the opposite side. Additional sheets of plastic or other materials can be laminated to these exterior surfaces to create panels for various uses.

Also described herein are three distinct cell/receptacle geometries that provide the desired physical properties in the core structures. In each case, the cells have an overall plan-view shape that is mirrored in the shape of the cell floor; e.g., a circular cell has a circular floor, a generally square cell has a square floor and a generally triangular cell has a triangular floor. We use the term "generally" because the square and triangular cells may have radiussed cell wall intersections or intermediate wall sections of partial depth.

Accordingly, a first aspect of the invention is a molded polymeric core structure in the nature of board stock having a pattern of cells or receptacles formed on both sides wherein the cells are distributed in regular, side-by-side fashion; i.e., in rows and columns, to provide a high strength-to-weight ratio in the structure. The core structure can be used in many different applications such as floors, walls, ramps, bridges, roadways, walkways, docks, decks, boat hulls, truck trailer walls and other uses where load-bearing capability, size, thickness, rigidity, durability, and weight are important factors. The core structure can be "skinned" to provide a laminar outer surface on one or both sides or fully enclosed, or even stacked and bonded to additional core structures.

In each of several specific embodiments having cells or receptacles on both sides as hereinafter described in detail, the cells or receptacles are three-dimensional and symmetrical in the sense that they look the same, although offset, when viewed from obverse and reverse sides. In a first described embodiment, each cellular shape is nearly quadrangular or square and is characterized by four downwardly and inwardly sloping full depth major walls that are common only with cells on the opposite side of the structure. Interspersed between the uppermost portions of the full depth major walls are partial depth minor walls that are substantially vertical, and are common only to neighboring cells on the same side of the core structure. By "substantially vertical," it is meant that the minor walls are within five degrees or so of being vertical when the panel is flat and lying on a horizontal surface. Actual spatial orientation will depend on how the panel is oriented in use. These so-called minor vertical walls fit between the upper portions of the adjacent inwardly sloping major walls to form receptacles that can have eight or more interior walls near the tops. Alternatively, the minor walls can simply be radiussed or curved wall sections between major walls.

As hereinafter described in detail, structures made in accordance with this disclosure may vary in size and proportion. They may also vary in plan by varying the radii of curvature at the intersections between walls; the extreme case resulting in circular walls is hereinafter described. While essentially flat core structures are described, they may also be curved or contoured. By "major," we mean that these walls are larger and deeper than the minor walls. Moreover, the major walls extend, in the disclosed embodiments, to cell floors whereas the minor walls are only partial depth and do not extend to the floors. A cell floor on one side is an exterior top surface between cell openings on the opposite side. The minor wall edges defined the overall cell shape in plan view.

In another embodiment, also hereinafter described, the obverse and reverse sides are dissimilar, the ribs formed by the walls are thicker, and the intersections of the ribs are purely cruciform in shape; i.e., they do not form four-sided top surfaces as in the previously described embodiment.

In another embodiment, the cells have a substantially triangular geometry. These cells have three full-depth major walls that slope inwardly so as to converge at the bottom of a cell. They may form a triangular interior floor that also defines an exterior surface on the reverse side. These walls, like the sloping major walls of the first embodiment, are common only to cells on the reverse side of a two-sided structure. Between the three major walls are substantially vertical and generally triangular partial-depth minor walls. These walls are common to adjacent cells on the same side, and may form three-legged ribs where they intersect with the walls of neighboring cells. The minor walls may be pleated, i.e., vertically bifurcated or radiussed.

In both of the square and triangular embodiments described above, the vertical walls or "ribs" can generally be triangular and, in a double-sided structure, the upper triangular rib on the obverse side aligns with the inverted triangular wall on the reverse side to produce a continuous beam between the opposite surfaces of the core structure. This produces substantially increased beam strength in a molded panel.

As described above, the walls of the cells may be polygonal, and the wall intersections may be variably radiussed. With maximum radius, the walls become tapered cylinders with circular floors. The tapered cylinders on one side are nested between the tapered cylindrical cells on the opposite side of the panel. An advantage of this arrangement is increased top and bottom panel surface area, a feature that improves adherence when, for example, panels are joined to sheets of dissimilar material such as metal, or are joined to like panels by fusing or with adhesives. The tapered conical walls may have substantially straight sided upper annular collars.

The structures as described above are readily made by way of a compression molding process in which a flat sheet of heat-softened material such as high-density polyethylene (HDPE) or polypropylene is placed between parallel conjugal molds having the character as essentially described above. The molds are brought together under pressure, usually hydraulic, to deform the sheet material in opposite directions away from the base plane, thereby simultaneously forming the cells or receptacles on both sides of the resulting structural component or structure. The compression molding process may be preferred because it can produce a desired material distribution that cannot normally be realized by other techniques. However, it is also possible to thermoform and/or injection mold structures having the geometries disclosed herein. In the case of thermoforming, twin sheet technology may be used to create hollow wall structures.

In accordance with a another aspect of the invention, structural panels, building walls and floors, temporary roadway components, boat hulls, docks, walkways, pallet decks and legs, and a wide variety of other structures can be fabricated by laminating additional plastic structural components such as flat panels to close the cells or to join panels to one another. In one example, flat sheets of plastic or metal "skins" can be placed over and fused or otherwise adhered to the flat surfaces on either side of the structure to close the receptacles on that side. Skinning can be done on one or both sides. In another example, flat or curved sheets can be laminated to both sides of the symmetrically molded cellular structure to close the cells on both sides and additional layers of cellular material may be built up in a parallel fashion to create an overall structure of the desired thickness and strength. In still another iteration on the basic theme, two symmetrically cellular panels can be fused together face-to-face with the symmetric and regularly arranged open cells of one panel in registry with the open cells of another panel so that the two panels together form a regular distribution of closed cells. Skinning or stacking, if desired, may be carried out in a secondary operation. A bottom layer may have feet to form a pallet.

The following specification illustrates and describes the various aspects and embodiments with reference to drawings of molded and/or moldable structures as well as drawings of a mold which is used in a complemental, conjugal or mating fashion to form the illustrated structures out of flat sheets of heat-softened HDPE or other polymeric material. These sheets may come directly from an extruder in which case, they are preheated to the desired temperature or they may be premanufactured and stored, in which case, they are reheated and softened before entering into the press for the formation of the final structure.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF SUMMARY OF THE DRAWINGS

The description herein makes reference to the accompanying computer drawings and photographs showing different embodiments and molds.

FIG. 7 shows a laminated or "skinned" structural panel;

DETAILED DESCRIPTION

Figure 1:
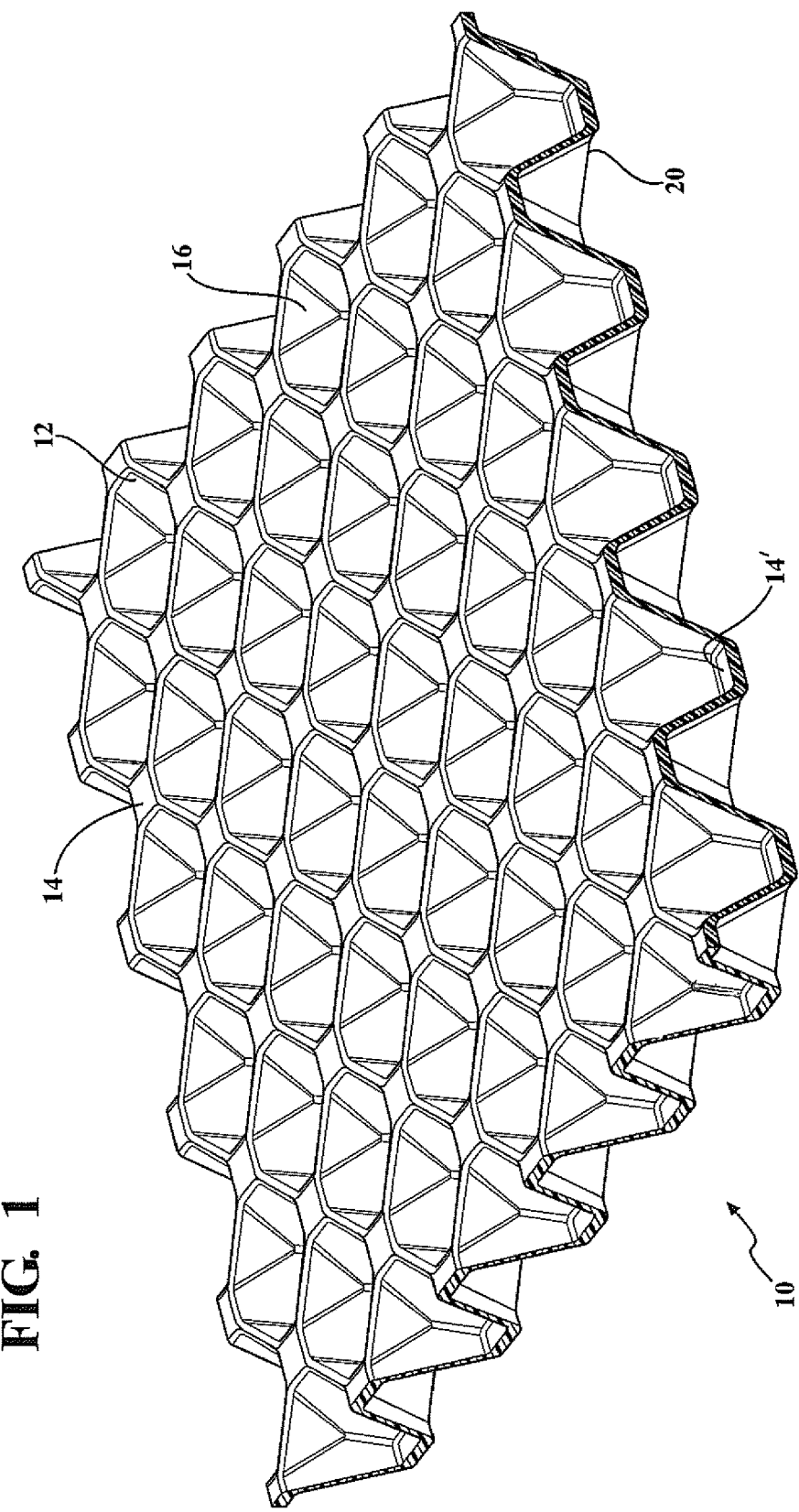
FIG. 1 is a perspective drawing of a section of a first illustrative molded structure embodying the invention.

FIG. 1 shows a representative portion of a two-sided molded HDPE core structure 10 from the obverse side, with the understanding that, in this embodiment, the reverse side may or may not be identical and is offset by one half of a geometric "period" in both directions. The core structure 10 exhibits a consistent geometry of open cells or receptacles, each of which, in this case, has four full depth, inwardly sloping, major walls 12 interspersed with four substantially vertical, minor walls 16 forming ribs between adjacent receptacles. The walls 12 extend down to four-sided floors 14' whereas the minor walls 16 do not. The result is a generally quadrilateral geometrical figure when viewed in plan from the top or obverse side. The outside surfaces of floors 14' on the opposite side. The tops of the ribs join coplanar lands 14 on the top plane. Lands 14 are ribs on the reverse side intersect to form similar lands that are the floors 14' which are lands 45 on the opposite side. While all of the receptacles are shown as the same size, they can vary in size in different areas with or without transition areas between on the obverse. As shown, the intersections between walls can be radiussed.

The sloping major walls 12, each with six sides have upper sides intersecting with the rib walls 16 and lower sides that intersect with the sloping walls of adjoining major walls in the same receptacle. The top and bottom edges of walls 12 form the square lands and floors 14 and 14'. The outside land surfaces 14 can receive and be fused or otherwise adhered to a flat panel 74 as shown in FIG. 7 to form a "skinned" structure 70 having what may be used as a load-bearing deck. This structure also can serve as a structural panel for building a wall, floor, ceiling, roof, temporary roadway, pallet, or any of a host of other objects. The skins can be HDPE or other materials and may vary widely in thickness. As mentioned above, a bottom skin may have feet or other structures to serve as a pallet.

Figure 5:
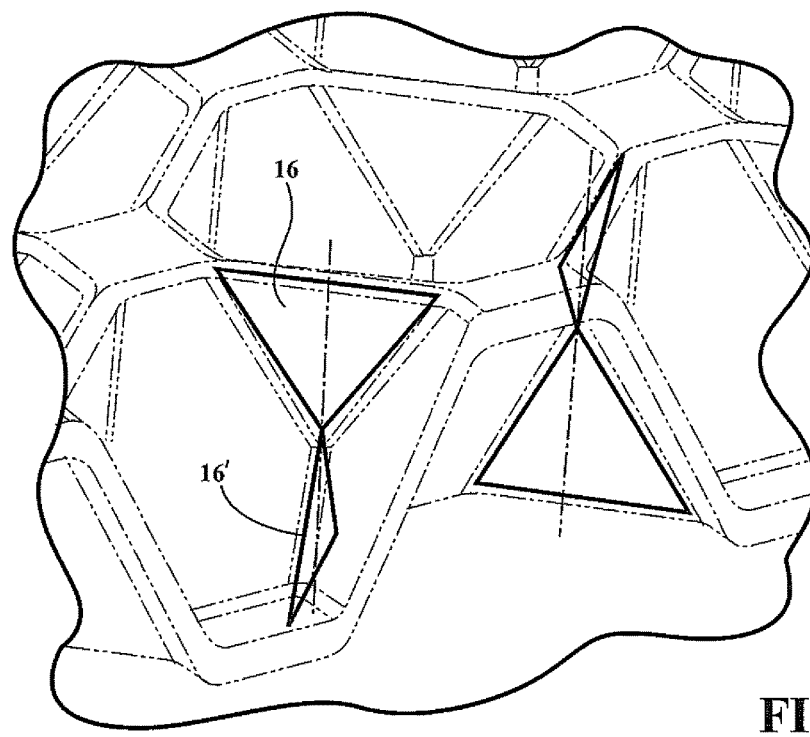
FIG. 5 is a phantom view through a molded structure showing how mutually inverted triangular cell ribs meet to provide beam strength.

The triangular rib-forming vertical walls 16 in a given cell on the obverse are common only with adjoining receptacles on the same side. In addition, the apex of a rib wall 16 meets the apex of an inverted rib wall 16' on the reverse side, the plane of the latter 16' being rotated 90° relative to the plane of the wall as shown in FIG. 5. This aligned vertical structure provides a beam running fully through the structure from one side to the other. The floors 14' can be thicker than the walls 16; the ribs can be thicker or thinner than what is shown.

Figure 6:
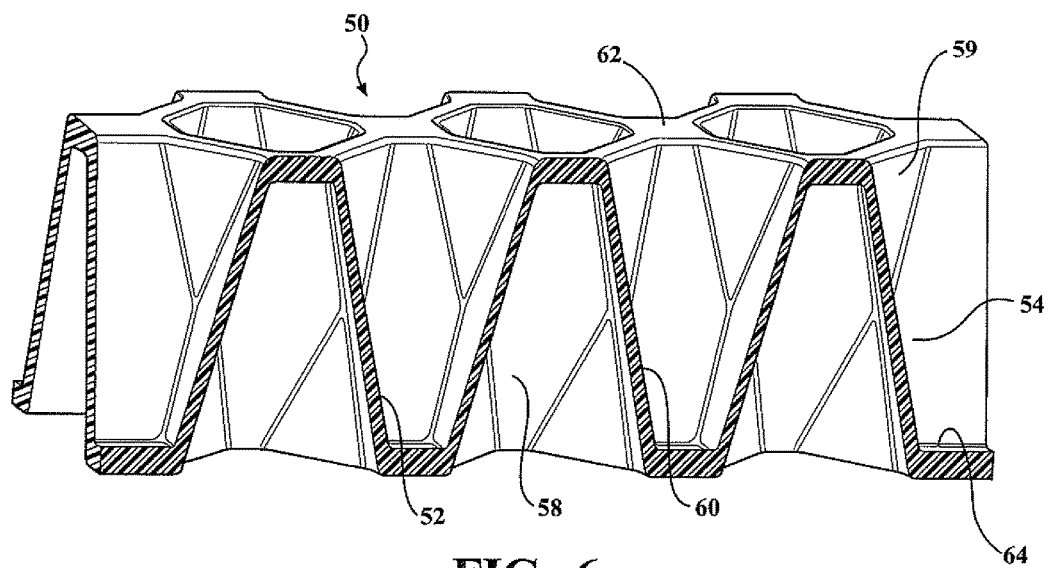
FIG. 6 is a perspective view partly in section of another molded structure of taller geometry relative to the structure of FIG. 1.
Figure 7A:
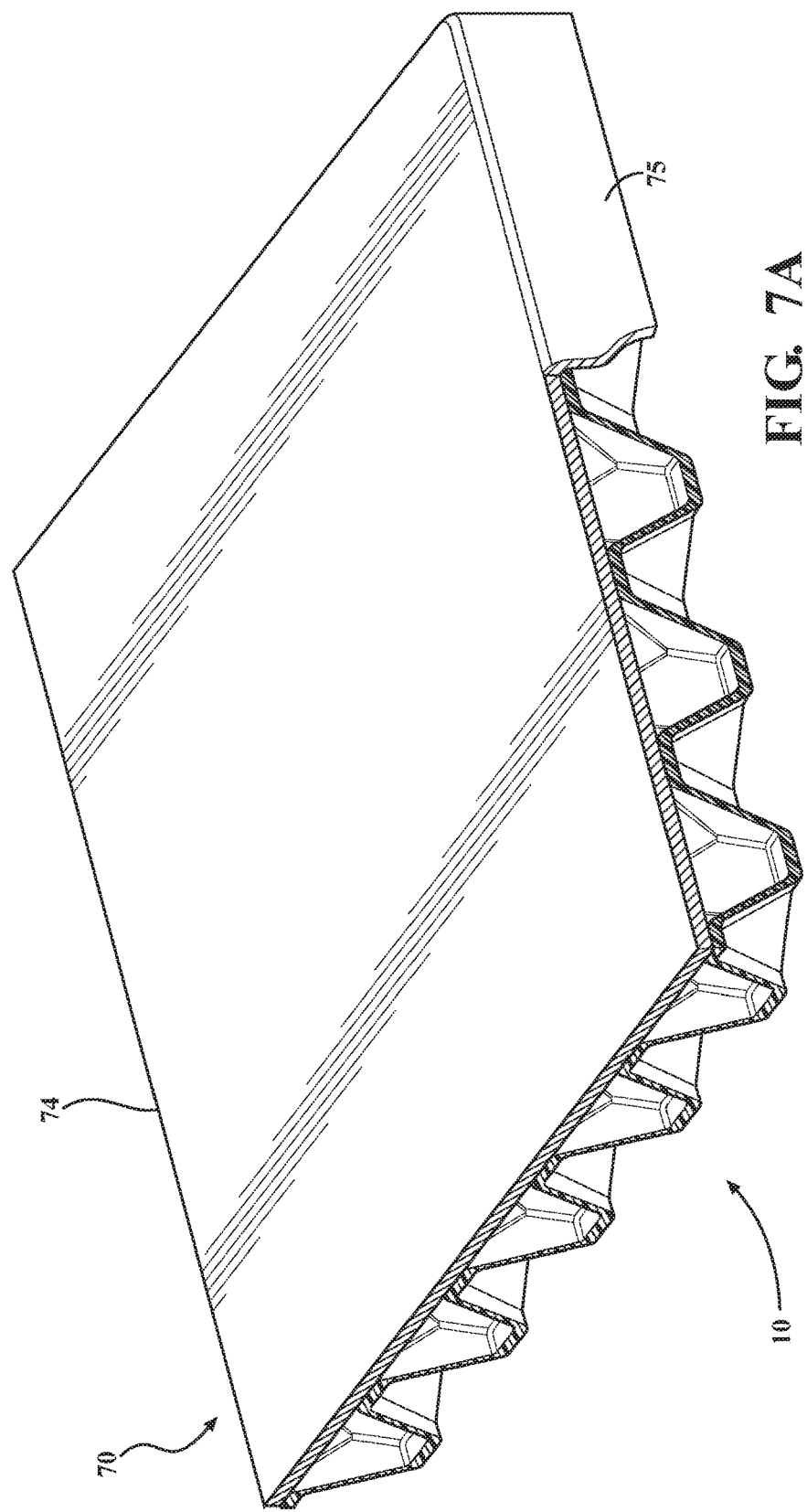
FIG. 7a shows a skinned panel with side panels.
Figure 7B:
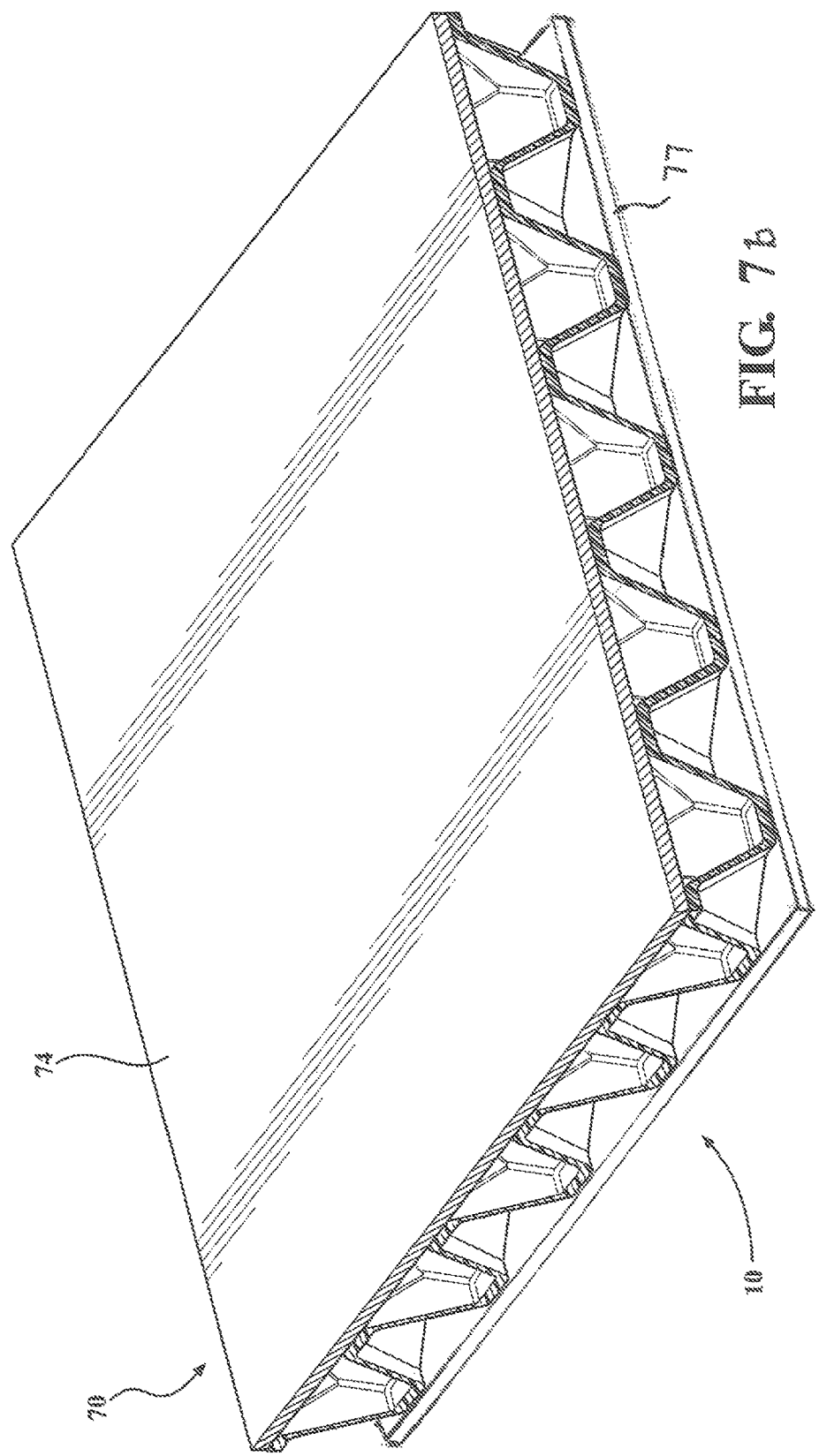
FIG. 7b shows a panel skinned on both top and bottom.
Figure 8:
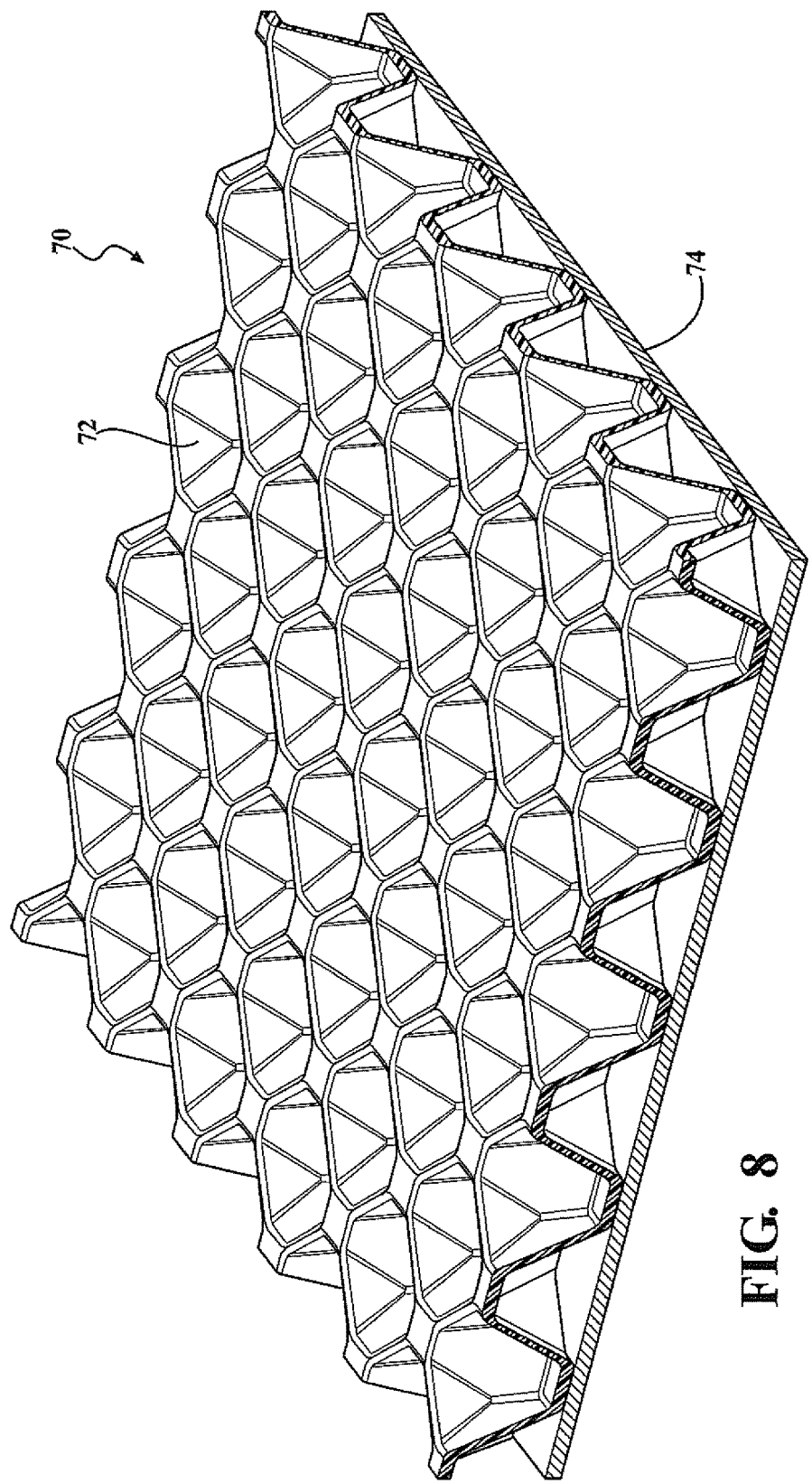
FIG. 8 is a perspective view of the structure of FIG. 1 laminated to a flat bottom panel.
Figure 17:
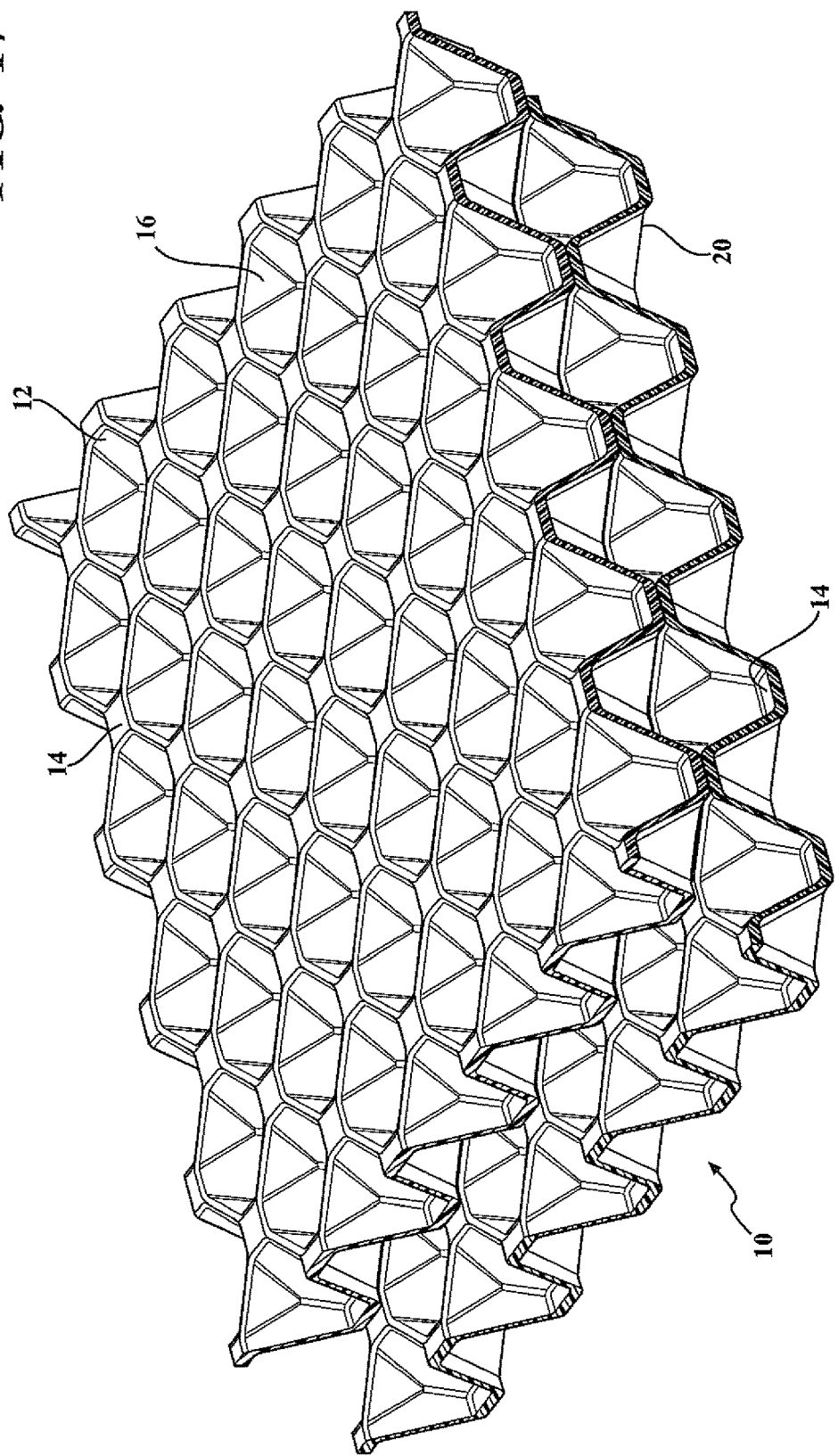
FIG. 17 is a perspective view of a two-tier structure comprising two double-sided core structures fused together to close at least some of the interior cells.

In the embodiment of FIGS. 1, 5, 7, and 8, the thickness of the material in the top and bottom plane surfaces 14 and 14' can be greater than the thickness of the walls 12 similar to the manner in which the top and bottom plates of an I-beam are generally made thicker than the center rib of the I-beam. This contrasts with what would result if structure 10 were thermoformed; i.e., these walls would be normally thinner than the original unformed sheet. In addition, the areas of the planar surfaces 45 and 14' provide large areas for fusing additional structures to the structures 10. For example, identical structures 10 may be fused to one another in face-to-face relationship to create closed cell structures in which the cells are double the height of the open cells shown in FIGS. 1 and 6. This is shown in FIG. 17. Alternatively, flat sheets 74 may be laminated over the structures 10 to close the cells, as shown in FIGS. 7 and 8. It should be understood that while the drawings show the laminated structure in which a flat sheet has been laminated over one side, additional sheets may be laminated to the opposite surface of structure 10 to close both sides of the symmetrical cell arrangement, and, as shown in FIG. 7a, side panels 75 can be added to create a fully enclosed or sealed structure if desired. FIG. 7b shows the core structure 10 with both a top skin 74 and a bottom skin 77 fused or adhesively bonded to the outside surface areas of the core structure. The skins may be plastic or metal.

Figure 2:
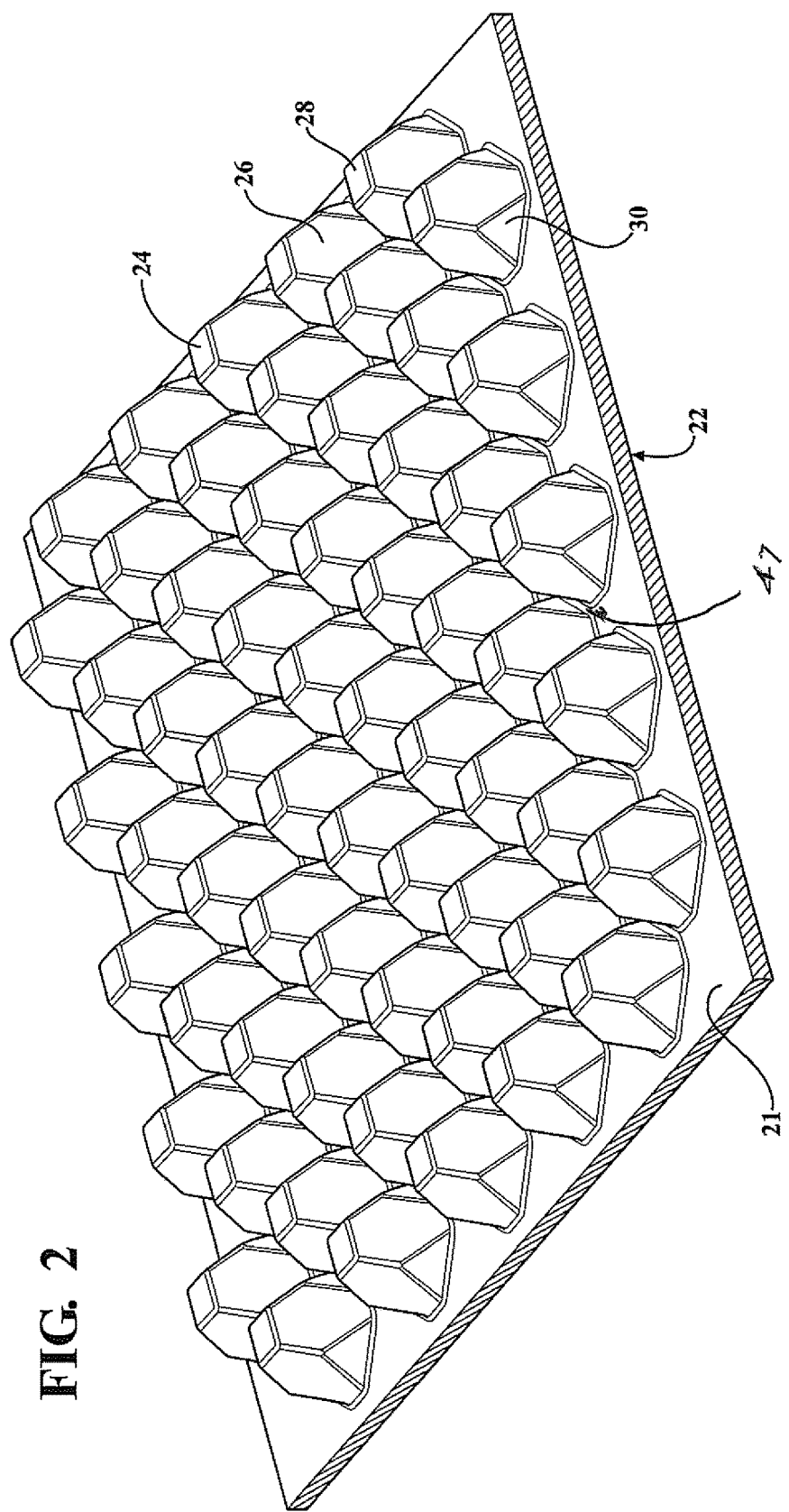
FIG. 2 is a perspective view of half of a mold set for making the structure of FIG. 1.
Figure 3:
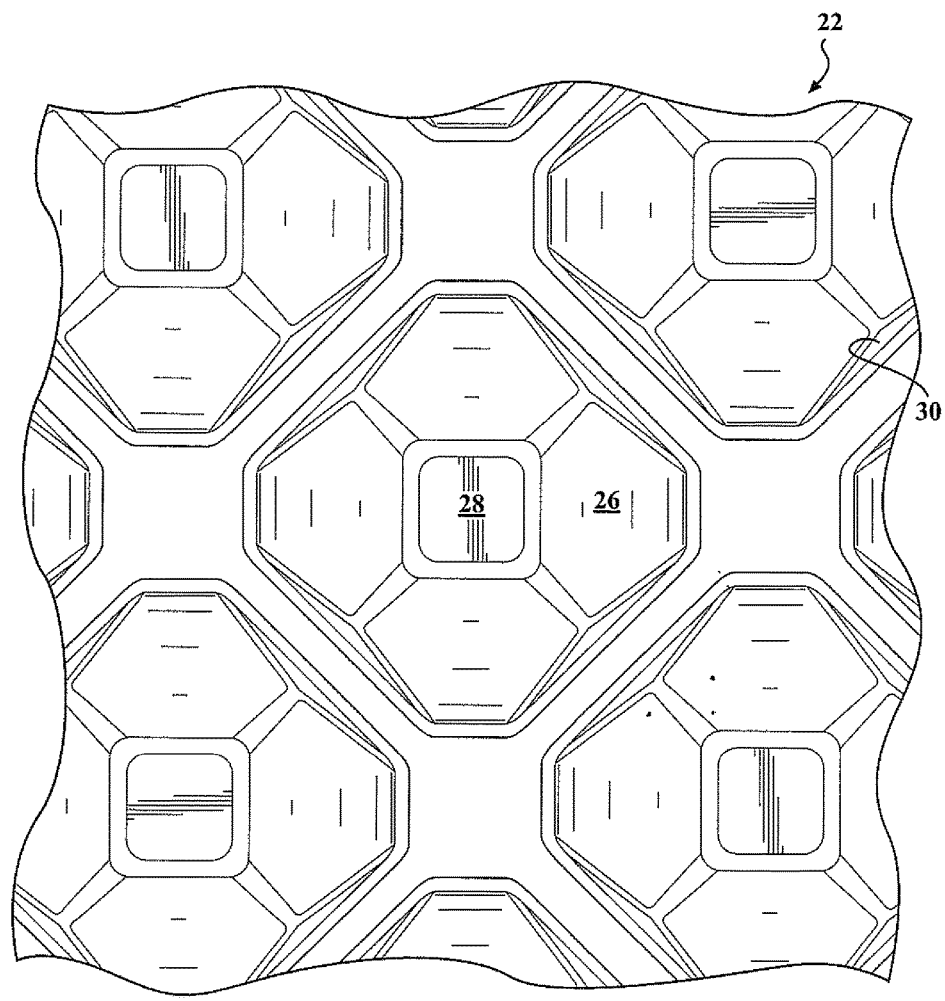
FIG. 3 is a plan view of a mold.
Figure 4:
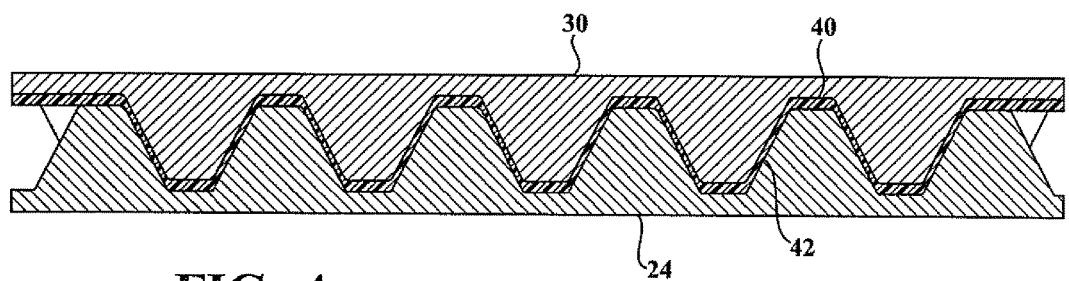
FIG. 4 is a sectional view of two complementary molds brought together to form and compress a layer of HDPE between them.

FIGS. 2, 3, and 4 illustrate part or all of a mold apparatus which can be used to make the invention structure. FIG. 2 shows one such mold 22 to have a platen 21 with upwardly projecting elements 24 arranged in a regular two-dimensional pattern. Each mold element comprises a set of four six-sided surfaces 26, a top planar surface 28 which is parallel to the plane of the plate 22 and a set of four triangular surfaces 30 which are integral with the angled surfaces 26 but which are substantially orthogonal to the plane of the base plate 22 of the mold. The elements 24 are spaced apart to provide a continuous clearance that, as persons skilled in the molding art will realize, defines the molded structure geometry when two conjugal platens or molds are brought together as shown in FIG. 4. It will be further noted that there are slot-like vertical clearances 47 between closely adjacent surface projections or elements 24 that form the clearances 47. Each projection has four such surfaces arranged at 90° intervals around the base of the projection. The upper mold does not extend into the clearances 47 and, therefore, plays no part in forming the rib walls 16 on the side of the structure shown. The other mold (not shown) has surfaces that form the inverted ribs as explained with reference to FIG. 5.

It will be appreciated that the apparatus shown in FIGS. 2, 3, and 4 is suitable for use in a compression molding process wherein the two platens 24, 30 are driven together by hydraulic pressure in a conventional mold press to form the core structure from a flat sheet of plastic. This is the preferred method of molding the structure 10. However, it is to be understood that the structures 10 may also be fabricated using conventional injection molding techniques wherein the mold is closed and is provided with openings or sprues for the inflow of fluid plastic from the injection molding machinery. It is also to be understood that while HDPE is described as the preferred material for molding the structures 10 and associated structures also described herein, structures 10 also may be made of polypropylene or other polymers depending on the desired strength and other characteristics for the finished structure.

FIG. 6 shows a structure 50 similar in geometry to structure 10 but taller. The tapered, full height walls are shown at 52, 58, and 60 while the vertical partial walls are at 59. The obverse top surfaces are at 62 while the floors are at 64. Again, the floors are thicker than the walls. The slope angles of walls 52 are more vertical than walls 12 because of the greater height.

While the structure 50 shown in FIG. 6 is taller than the structure 10 shown in FIG. 1, it will be appreciated that the geometry; i.e., the arrangement of sloping and vertical walls is similar as between the two structures 10 and 50, and that both structures exhibit interconnected vertical ribs with square or diamond-shaped intermediate surfaces, both top and bottom, creating areas to receive, where desired, skin sheets or other structural components, such as inverted structures of identical construction.

FIG. 8 shows a structure 70 comprising the laminated or fused combination of a compression molded cellular HDPE structure 72 and a flat sheet 74 of HDPE material. The two elements 72, 74 have been joined by thermal fusing to create a laminated structure which can be used for a variety of purposes including structural panels, temporary roads or runways, floors and a wide variety of other structures. Sheet 74 is fused to the surfaces of structure 70 corresponding to the square top surfaces 12 or the bottom surfaces 14 of structure 10. The wide geometry of the cells in the structure 70 shown in these figures is exactly the same as that of the structures 10 and 50 shown in the previous figures, the primary difference being the fact that a flat sheet 74 has been laminated over and fused to one side of the cellular structure effectively closing the cells that would otherwise be open from that side of the structure. There are many uses of such resulting structures wherein one side of the cellular structure is left open and the other side is closed. Alternatively, another flat sheet can be fused to the opposite side of the structure 70 in which case all of the cells are closed. Still another alternative is to fuse or otherwise attach a mirror image cellular structure to the structure 72 so as to create double-high closed cells wherein the flat surfaces which are parallel to the original base plane are brought together and fused together by thermal welding.

Figure 9:
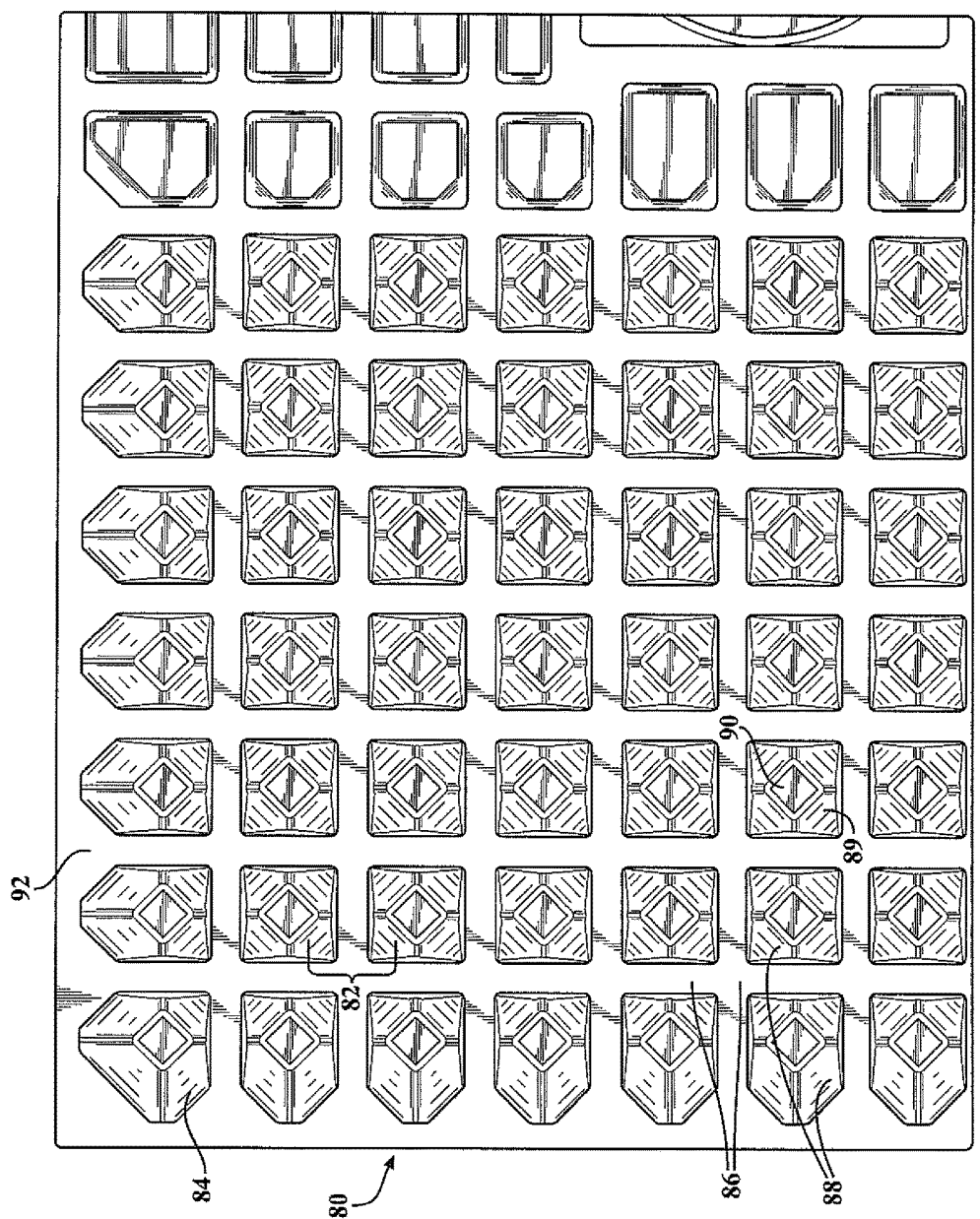
FIG. 9 is a plan view of an embodiment of the invention with alternative edge geometries.
Figure 10:
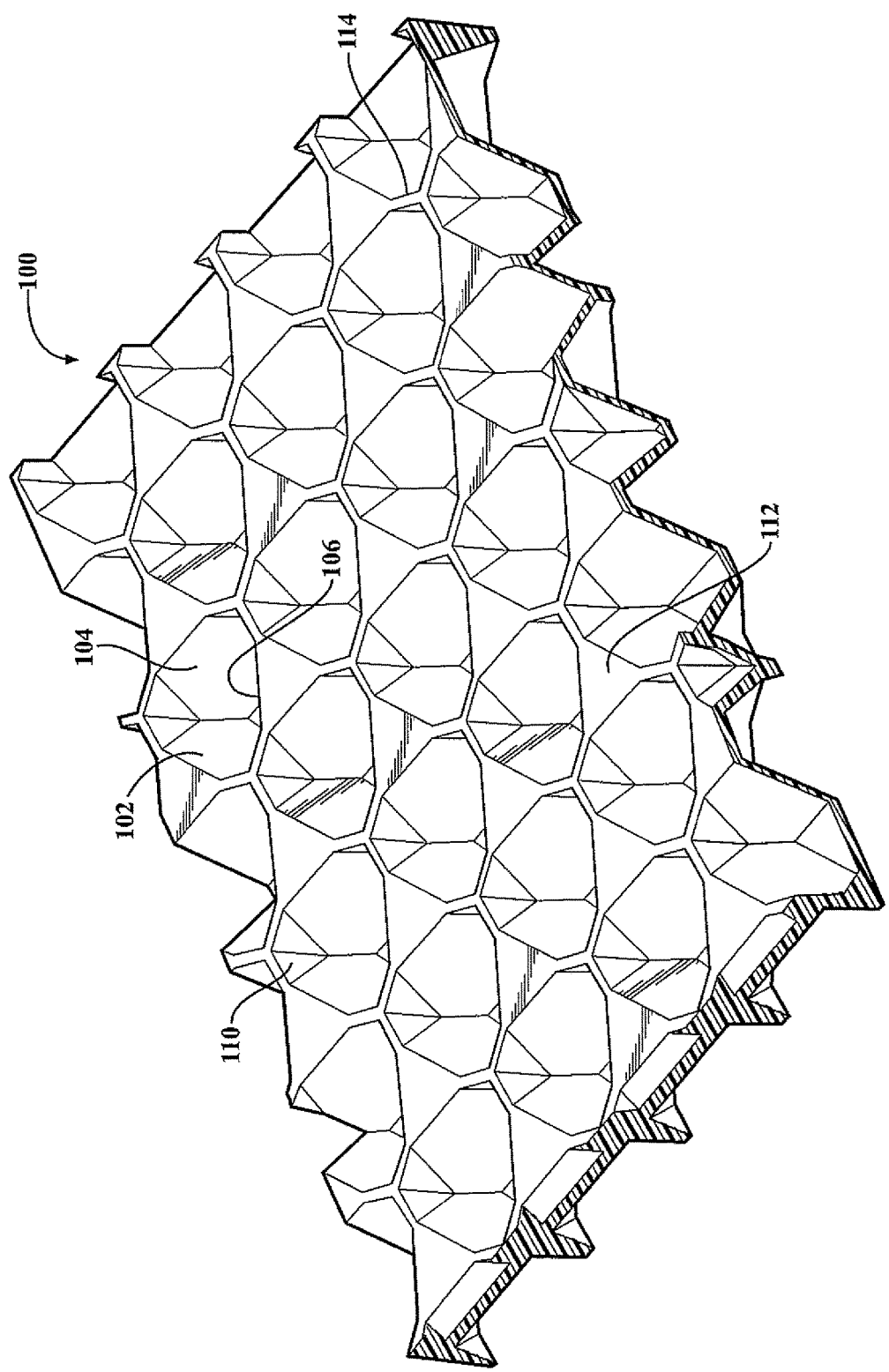
FIG. 10 is a perspective view of another embodiment with a generally triangular geometry.

FIG. 9 is a plan view of another structure 80 showing 7 rows and 7 column of receptacles or cells 82. The topmost row and the left most column have cells 84 that are different in geometry from the cells 82 as hereinafter described.

Cells 84 are essentially four-sided in top plan view, are separated by ribs 86 that form purely cruciform intersections; i.e., there are no square lands at the intersections of the ribs 86. This is the result of making the vertical rib-forming walls 88 thicker than the corresponding rib walls in the embodiment of FIG. 1. However, each cell 82 also has sloping walls 89 with bottom boundaries that form the four-sided floors 90 of the cells a shown. The cells 84 are enlarged on the outside and virtually eliminate one of the rib-forming vertical walls. The lattice-like surface 92 lies entirely in a single plane.

The process by which the structures described herein are made may involve (1) the manufacture of a set of molds having the geometries disclosed herein and proportions according to the desired proportions and dimensions of the final structure. This is preferably done by model-making and CNC Machining. The two molds are made in such a way as to provide the necessary clearances between elements such as 24 to perform the vertical ribs as described above and to exhibit the necessary structural strength and heat resistance to allow them to carry out the compression molding process.

The molds are then arranged facing one another in a hydraulic press of sufficient size and strength as to allow the molds to travel toward one another and apart from one another to cycle through the molding process. Sheets of material, such as HDPE of the desired thickness or gage are brought into position between the two opposing complemental molds. The sheets are either preheated or brought directly from an extrusion press in heat-softened condition so as to be ready for the compression molding process. The mold plates are then brought together to the desired degree under the desired pressure to squeeze, compress and cause material from the sheet to flow into the geometry between the mold elements until all of the clearance between the two mold plates has been completely filled. The mold plates are held in this condition until the structure has been fully formed and are then withdrawn from one another and the resulting structure is removed from the press. A cooling step may be performed at the appropriate time in this sequence. This is conventional and need not be described in detail.

Thus, the disclosure has a number of different aspects: the first aspect is the molded structure and its specific and advantageous cellular geometry. The second aspect is the structural structure which can be constructed using lamination techniques wherein two or more molded structures are brought together or individual molded structures as described above are laminated to flat sheets on one or both sides of the structural panel or other structure of manufacture. The third aspect is the compression molding technique which involves the creation or construction of molds having the desired complemental geometries and the use of those molds in combination with sheets of heated plastic material to form structures of the desired shape, size and proportions as described herein.

The principal characteristic of the molded structure, whether created in accordance with or by use of the compression molding process described above or by injection molding or thermoforming, is a geometry characterized by a three-dimensional array of receptacles or "cells" having both sloping side walls with selected wall thicknesses and material distribution so as to maximize strength while at the same time eliminating wasteful allocation of material into thick vertical sections where thin structures work equally well or better. In a two-sided structure, the receptacles on the obverse and reverse sides may be identical or different in geometry. Where ribs are present, they may be thick or thin or of intermediate thickness; they may intersect in a cruciform area or in a multi-sided land. Finally, both open cell structures and skinned, closed cell structures are possible in accordance with the teachings herein.

Referring to FIGS. 10 through 16, there is shown a second embodiment of the invention in form of a molded HDPE structure 100 which has all of the same advantages and attributes as well as all of the same potential uses as the structure 10 shown in the previous figures. The difference is in the shape and the number of surfaces in each of the receptacles. Again, this is a two-sided structure; i.e., there are receptacles on both the obverse and reverse sides of the structure 100.

As shown best in FIGS. 10 through 16, the structure 100 is molded in such a way as to produce a network of open recesses, cells or receptacles having three major, downwardly and inwardly sloping walls 102, 104 and 106. These walls meet at a triangular floor 108 which is a top surface 112 on the opposite side. The major walls 102, 104 and 106, like the major walls of the quadrilateral embodiment, join with the lower portions or contiguous walls and extend fully to the floor 108; i.e. the planes of the major walls intersect one another at the lower portions and continue on down to the floors 108.

Figure 13:
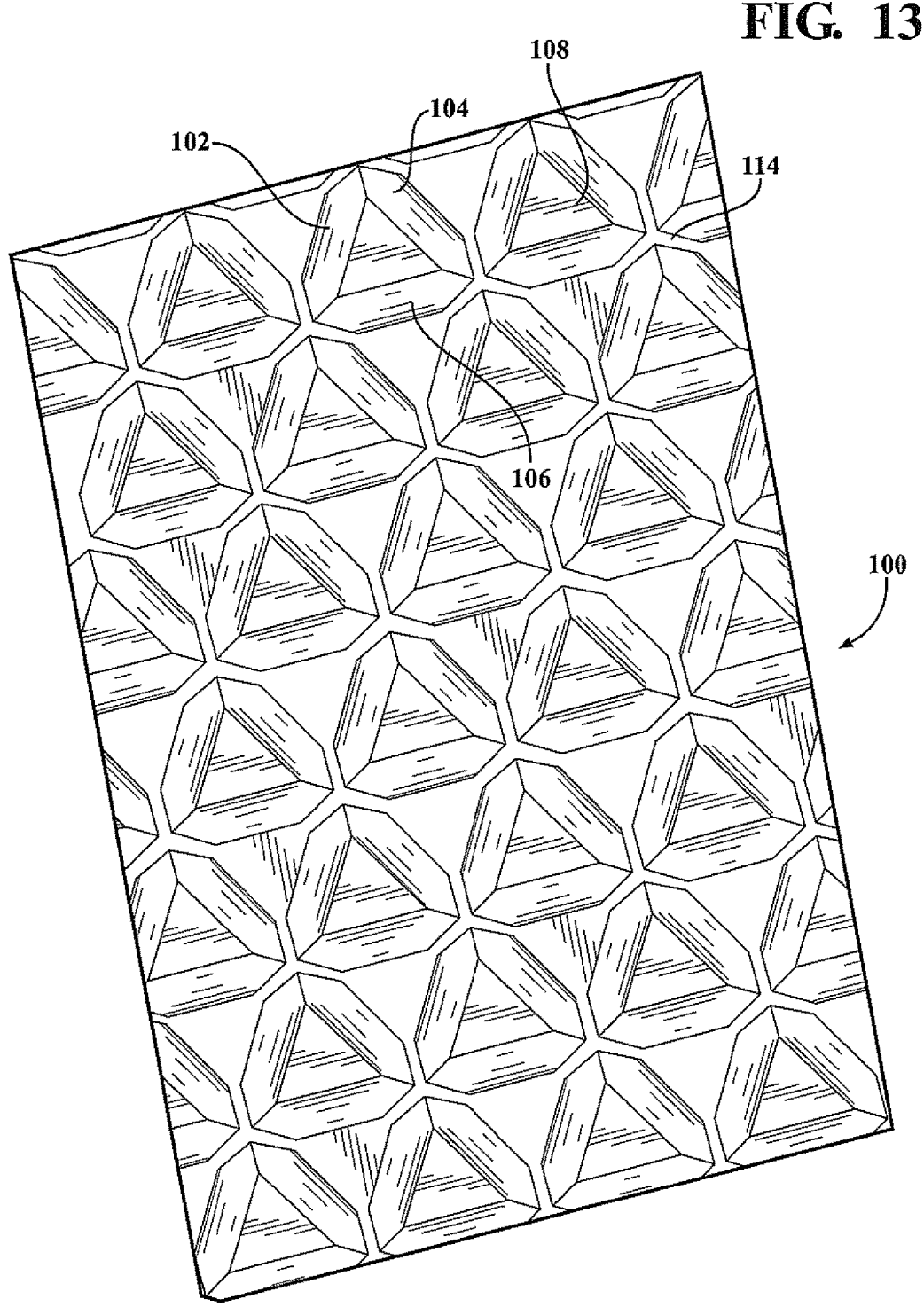
FIG. 13 is a plan view of the triangular cell embodiment.
Figure 14:
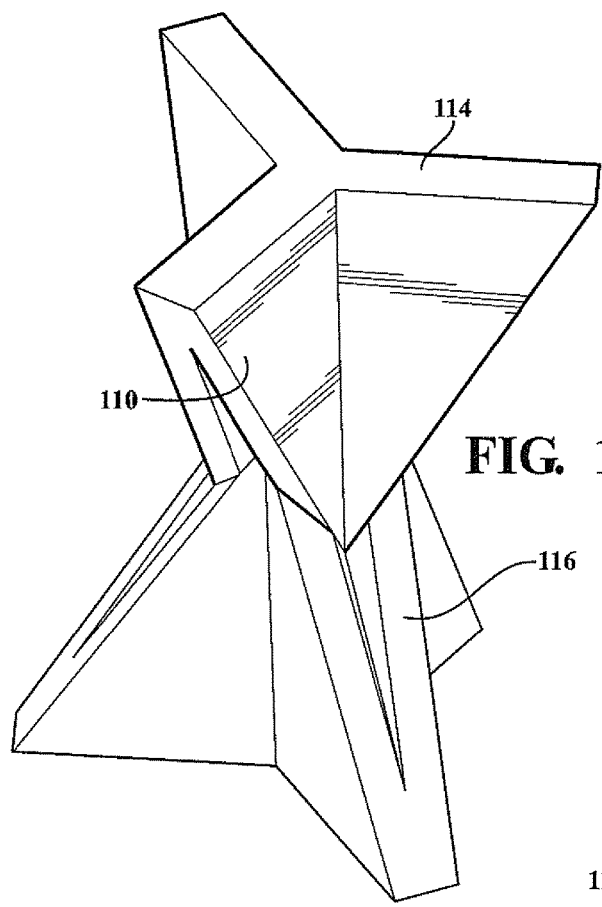
FIG. 14 is a view of how the minor walls of the triangular geometry meet in a two-sided panel.
Figure 15:
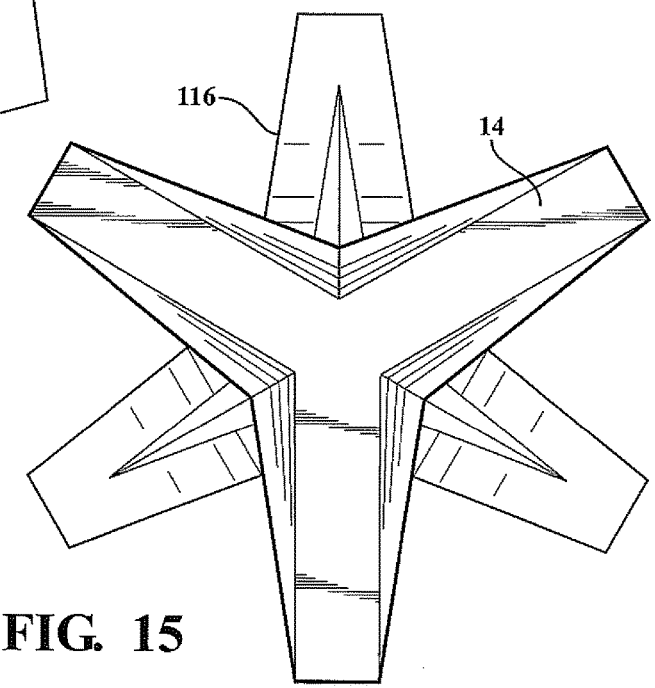
FIG. 15 is a top view of the elements of FIG. 14.
Figure 16:
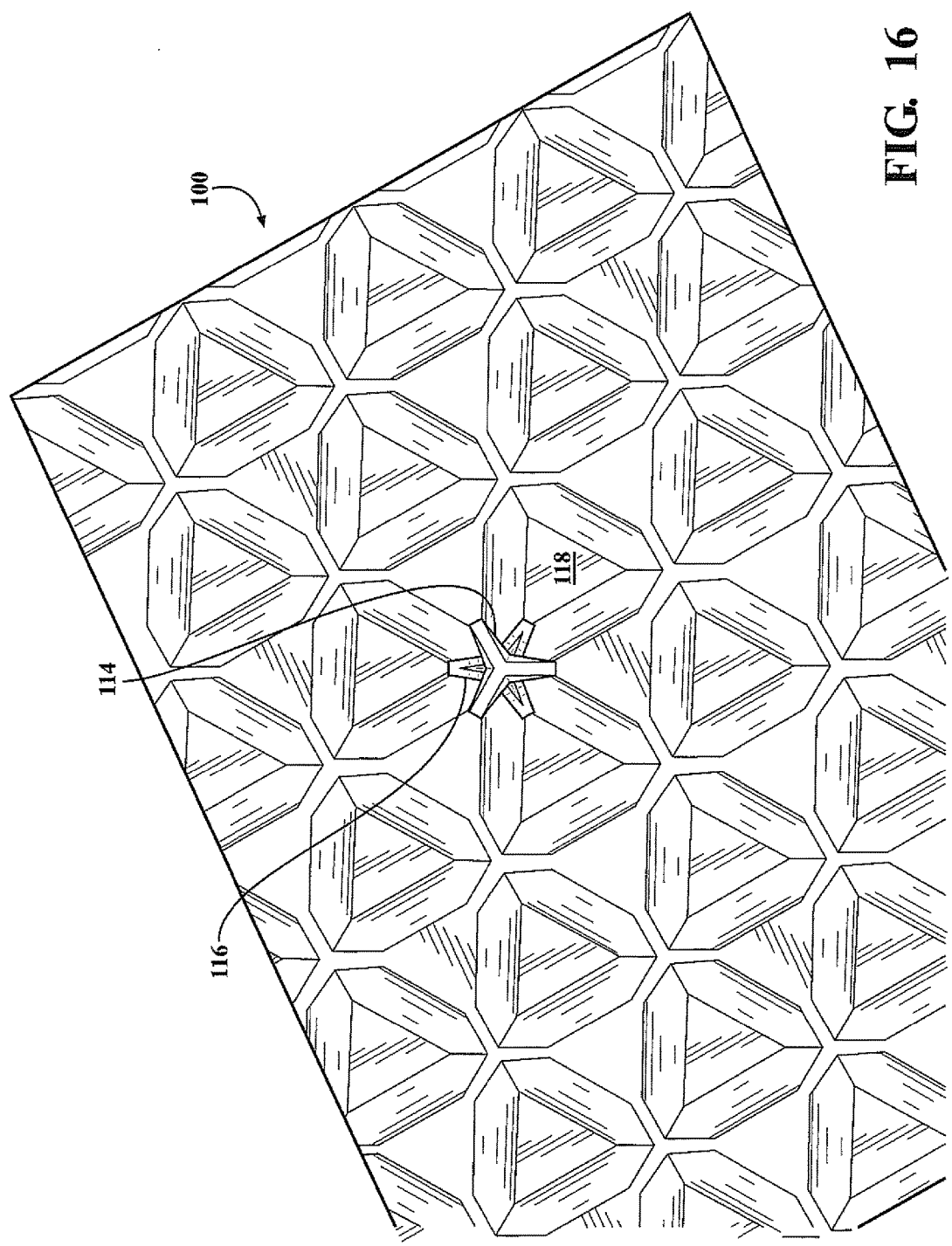
FIG. 16 is a plan view of the overall geometry amplified to show the rib structure of FIG. 14.

Minor walls 110 of essentially triangular geometry and substantially vertical in orientation when the structure 10 is lined on a horizontal surface are interspersed between the upper portions of contiguous major walls 102, 104 and 106. While each receptacle is substantially triangular in plan view as shown in FIGS. 13 and 16, in reality there are three major walls and three minor walls thus forming a generally six-sided figure. In addition, the minor walls 110 are, in this embodiment, pleated or vertically bifurcated to form two triangular wall sections. In this case, there are actually six minor wall portions, giving each cell a total of nine walls. The minor walls only extend part way from the top of the receptacle toward the floor; i.e., to the point where two major walls intersect one another. As shown in FIGS. 14 and 15, the apices of identical but inverted walls 110 and 116 meet one another, albeit rotated 60° from one another, to form continuous, substantially vertical beams in the panel to give it great load bearing strength. As an alternative, the pleated walls may simply be radiussed areas between the walls 102.

Figure 11:
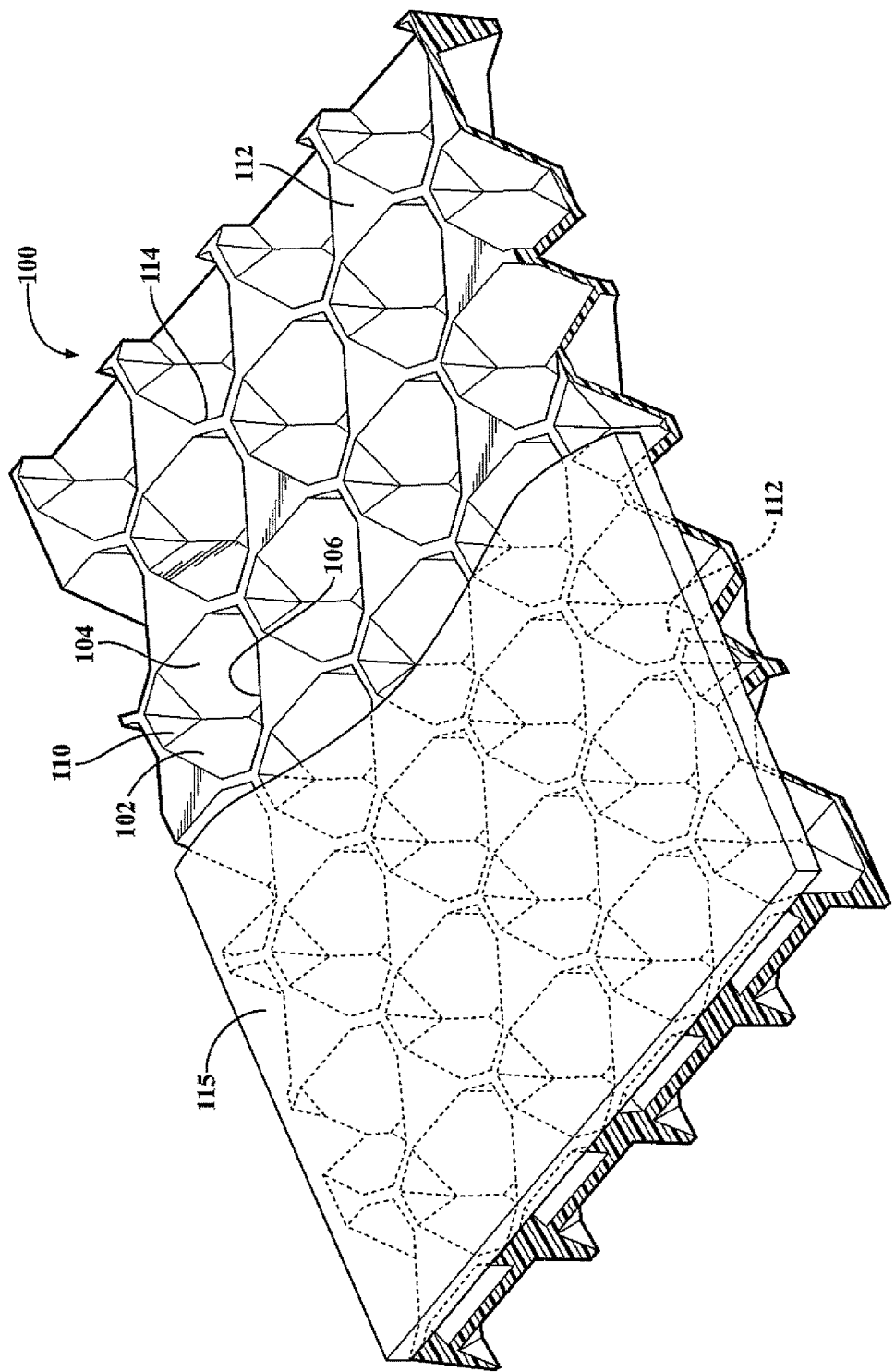
FIG. 11 is another perspective view of on the embodiment of FIG. 10 with a top sheet laminated to the cellular panel.
Figure 12:
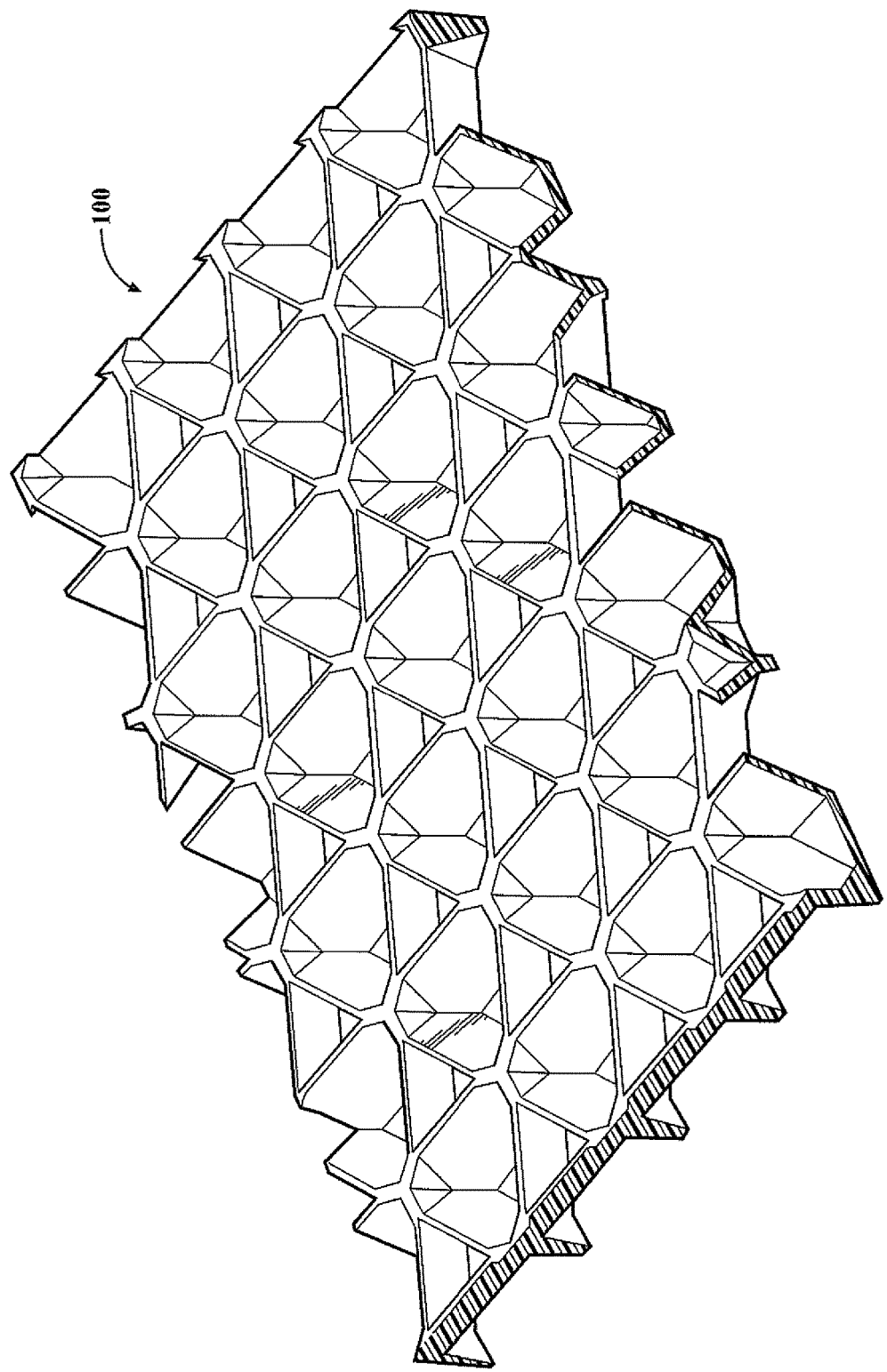
FIG. 12 is another perspective view of the embodiment of FIG. 10.

FIG. 12 shows the structure 100 with a plastic sheet 115 fused to the top surfaces 112 and to the three-legged ribs 114 that extend between them. While the cell geometrics are shown to scale, the skinning layer 115 is not, and may be of any thickness. For example, if a floatable structure with closed cells is desired, the skinning layer 115 would be thin to save weight and would be on both sides. The structure 100 can be constructed exactly as shown in FIG. 11. In the case of a temporary roadway structure, it may be advantageous to leave the receptacles open on the ground engaging side. In addition, the top surface created by laminating the flat panel 115 over the top of the structure 100 maybe textured for traction, non-slip performance, or appearance.

The term "vertical," as used herein, refers to the orientation of the minor walls of the receptacles when lying on a horizontal surface and is not intended as a definition of direction in space. Moreover, these "vertical" walls may actually have a slope or "draft" of up to about 5° to facilitate removal of the structure from the mold as will be understood by persons skilled in the molding art.

Referring to FIG. 17, this figure shows a structure 200 comprising a lower core structure 210 and upper core structure 220 fused together with no laminating layer in between. Both structures 210 and 220 are identical to the structure 10 shown in FIG. 1 but they could also be identical to the structures 100 shown in FIG. 10. The structures 210, 220 are joined top surface to bottom surface; i.e., top surfaces 222 of the lower structure 210 are fused to bottom surfaces 224 of the upper structure 220 throughout the structure 200 to convert most or all of the receptacles into closed cells of double height. This concept can be carried out three-high, four-high, or to whatever extent required by the particular application to produce a rigid structure with high strength to weight ratio because the majority of the volume the structure occupies in space is empty air. To state it otherwise, the structure shown in FIG. 17 is essentially a syntactic structure of closed, conjoined cells exhibiting a high enclosed volume to surface area ratio. It can be made floatable on water, stable on an earthen surface, highly durable, non-corroding, and extremely strong for its weight.

Figure 18:
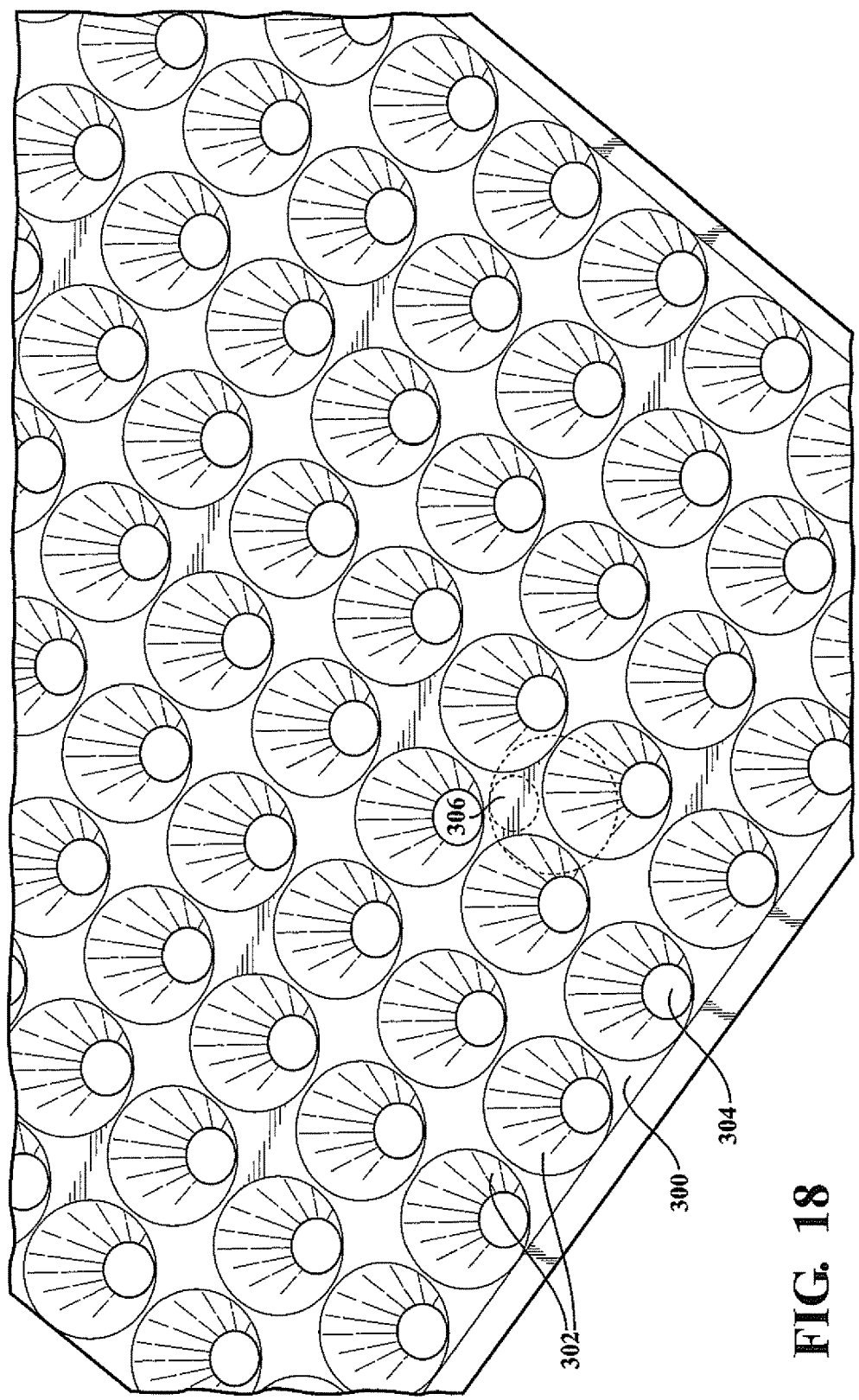
FIG. 18 is a perspective view of a two-sided panel with tapered cylindrical cells on both sides.
Figure 19:
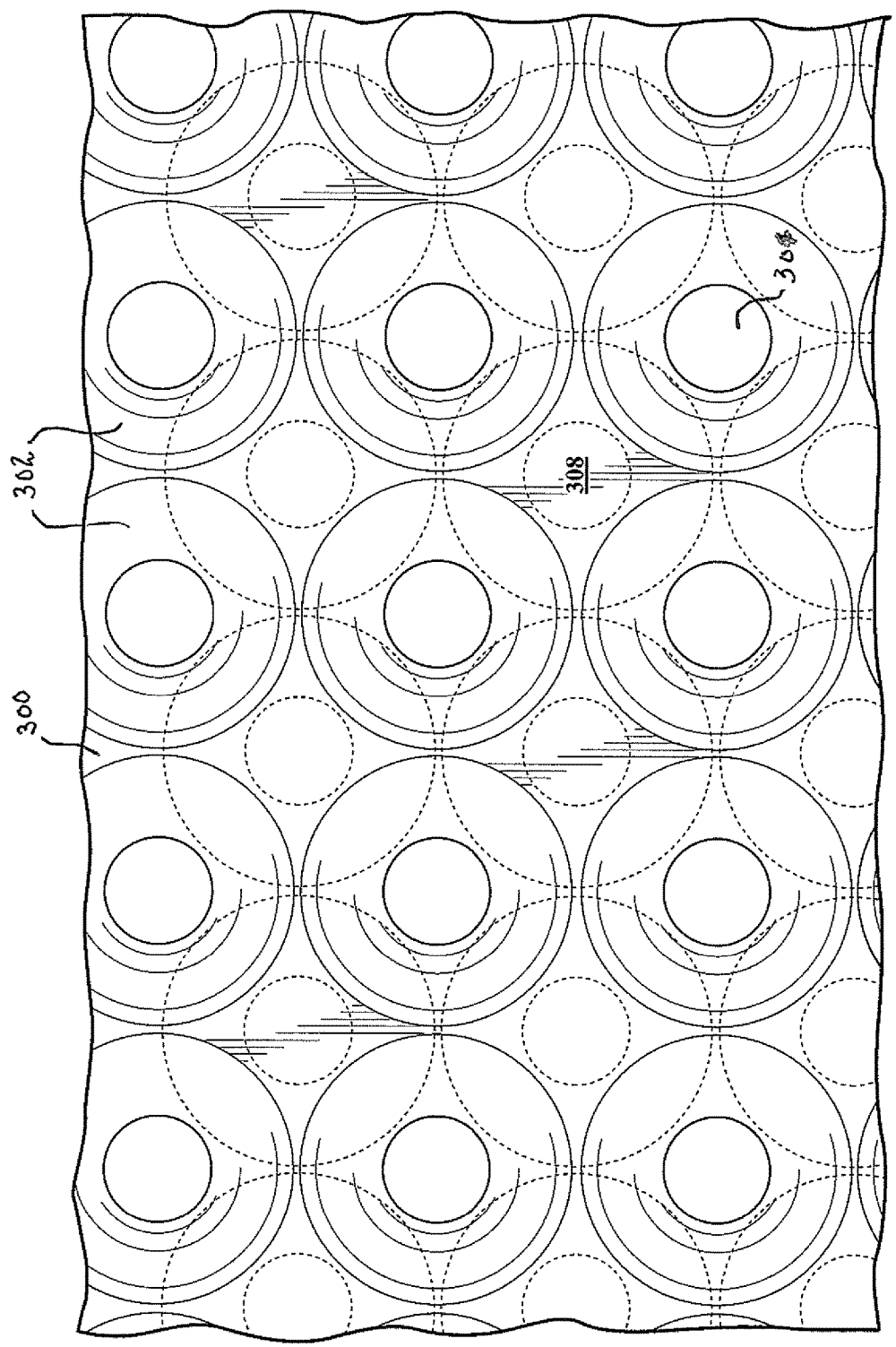
FIG. 19 is a plan view of the structure of FIG. 18.
Figure 20:
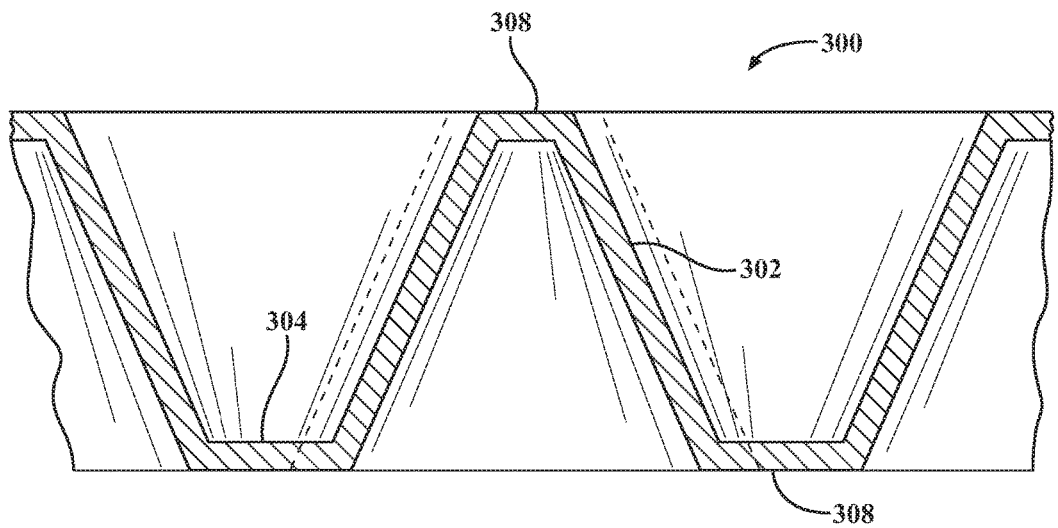
FIG. 20 is a side sectional view of the structure of FIG. 18.
Figure 20A:
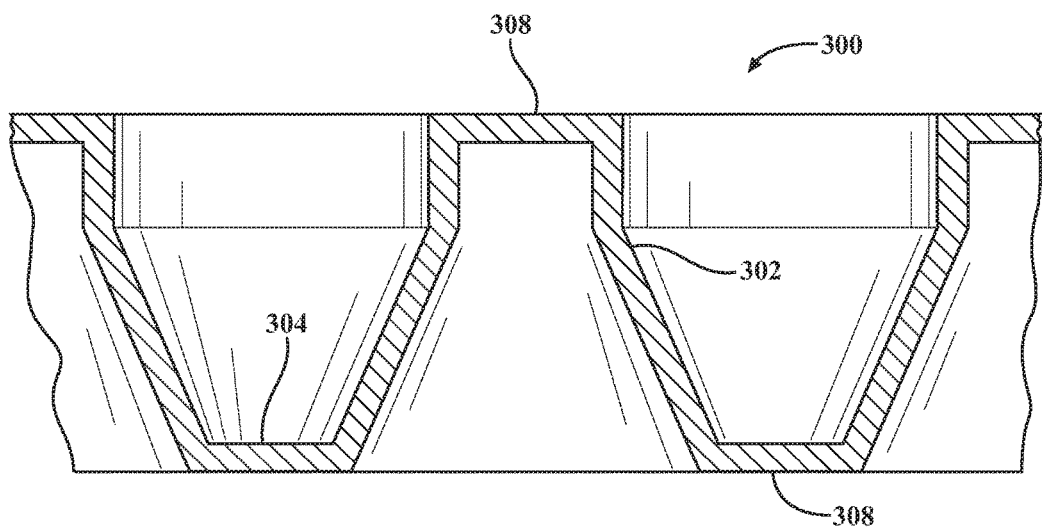
FIG. 20a is a side sectional view of an alternative design for conical cells.

Referring to FIGS. 18, 19, and 20, there is shown a panel 300 of molded HDPE or other plastic compression molded to create an array of cells 302 with tapered cylindrical walls having circular floors 304. Identical cells with circular floors 306 are formed in the reverse side of panel 300 and, as shown best in FIG. 19, the floors 306 lie between the cells 302 on the facing side. This arrangement creates four-pointed star-shaped areas 308 between cell openings with proportionately more surface area than is provided by the other embodiments disclosed herein. The slope angles of the cells can vary, as well as the panel thickness and overall size. The greater surface area facilitates adhesion where skins are added to the panels by adhesives.

It will be understood that while the invention has been described with respect to specific embodiment that a number of variations in these embodiment will occur to person of ordinary skill in the art and therefore these description are not to be construed in a limiting sense. All drawing figures are to scale except for the thicknesses of the panels 74, 75, and 77 in FIGS. 7a, 7b, and 8; and panel 112 in FIG. 11.

What is claimed:

1. A single-ply molded plastic core comprising a planar first surface and a planar second surface opposite and parallel to the planar first surface, each of said first and second surfaces comprising an integral network of co-planar intersecting ribs and having integrally formed therein an array of substantially-identical receptacles separated by the co-planar intersecting ribs;

each receptacle opening to one of the first or second surfaces and comprising a circumferential arrangement of inwardly-sloping, hexagonal major walls extending the full depth of a receptacle, triangular minor walls situated substantially perpendicular to the planes of the first and second surfaces and extending only partially from the opening of a receptacle through its depth, and a floor co-planar with the surface opposite to which its receptacle opens, said floor having edges, each of which adjoins an edge of a major wall;

wherein the major walls are adjoined to and alternatingly-interspersed with the minor walls;

wherein each of the major walls is common to a receptacle opening to the first surface and to a receptacle opening to the second surface;

wherein each of the minor walls is only common to neighboring receptacles opening to the same surface; and wherein each of the minor walls of receptacles opening to the first surface has an apex that is adjoined with an apex of a minor wall of a receptacle opening to the second surface such that the adjoining minor walls align to create a continuous beam structure extending from the first surface to the second surface.

2. A molded plastic structure comprising the single-ply molded plastic core of claim 1 and a sheet of material adhered to one of the planar first surface or the planar second surface of the single-ply molded plastic core such that at least some of the receptacles opening therein are closed.

3. A molded plastic structure comprising at least first and second panels, each comprising the single-ply molded plastic core of claim 1, wherein the first and second panels are joined together such that receptacle openings of the core of the first panel are joined in alignment with receptacle openings of core of the second panel in order to form closed cells in the combined structure.

* * * * *